UNITED STATES PATENT OFFICE.

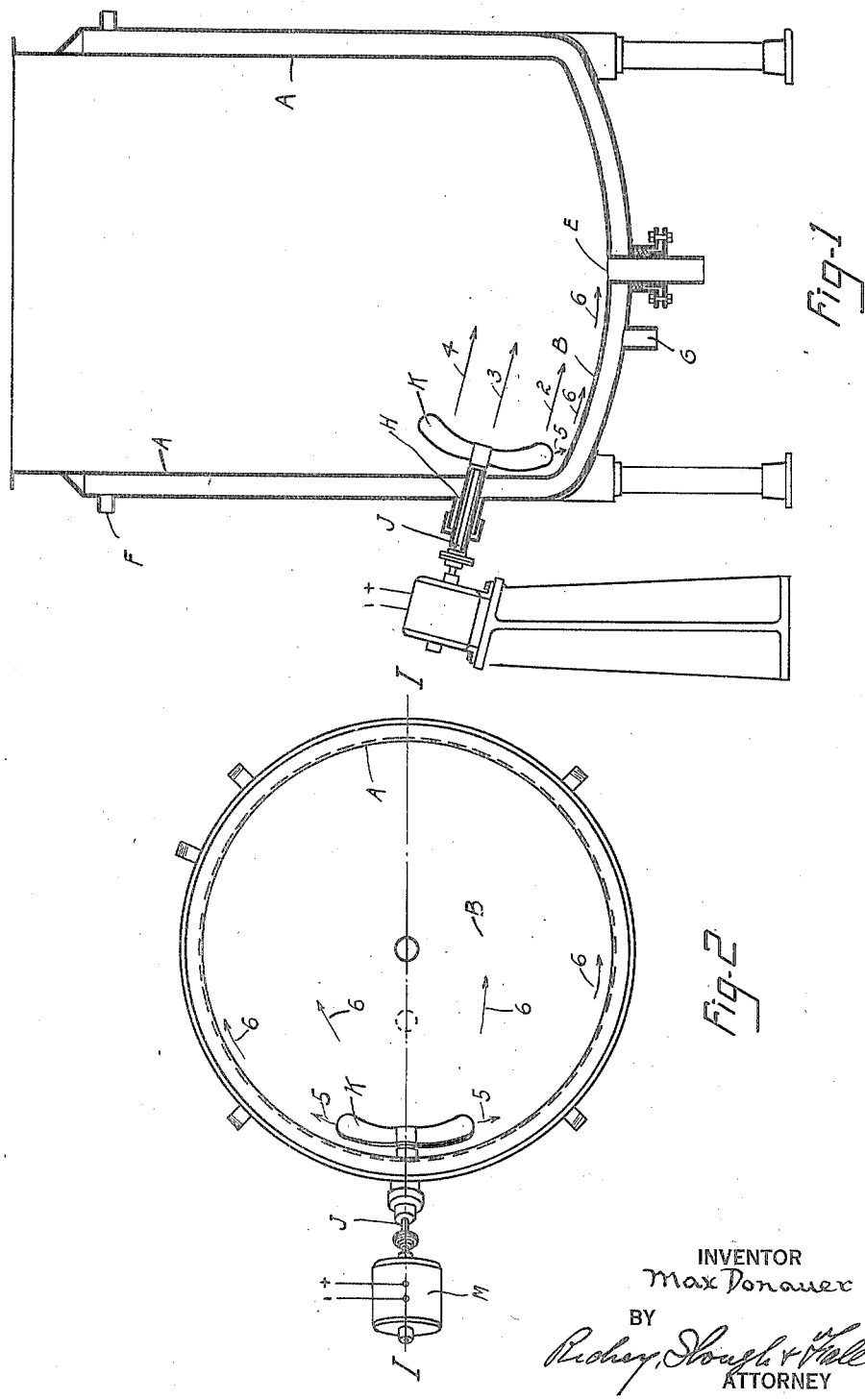

MAX DONAUER, OF ELYRIA, OHIO.

LIQUID-AGITATING MECHANISM.

1,399,699.  Specification of Letters Patent.  Patented Dec. 6, 1921.

Application filed July 1, 1920. Serial No. 393,431.

*To all whom it may concern:*

Be it known that I, MAX DONAUER, a citizen of the United States, residing at Elyria, in the county of Lorain and State of Ohio, have invented certain new and useful Improvements in Liquid-Agitating Mechanisms, of which the following is a full, clear, concise, and exact description, such as will enable others skilled in the art to which it appertains to make and use the same.

My invention relates generally to liquid agitating mechanisms, comprising a tank receptacle for the holding of liquid, and a movable element placed therein to agitate the liquid; more specifically my invention contemplates a tank, and a propeller placed in the tank and so arranged that the liquid contents of the tank are adapted to be thrown into agitation when the propeller is rotated, whereby the different particles of the liquid are exposed to the inner walls of the tank for uniform periods and that the different particles contained in the liquid may be thorough intermingled in such a way as to produce a homogeneous mixture.

Other objects of my invention and the invention itself may be better understood from the description of the embodiment thereof herein illustrated in the drawings accompanying this specification, and in which,—

Figure 1 shows a view, partially in section, of an embodiment of my invention,

Fig. 2 shows a plan view thereof, the view of Fig. 1 being taken on a line I—I of Fig. 2.

Referring to the drawings, at A—A are shown curved side walls of a cylindrical tank having a downwardly dished bottom wall B, the said tank being adapted to be used as a container of liquids. About the side walls and bottom wall of the tank is arranged a jacket C for the purpose of providing a thermal jacket chamber D, which may contain a refrigerant or heating medium for the purpose of thermally effecting the liquid contents of the tank through the walls A and B thereof.

At E is shown an opening in the bottom wall of the tank for the egress of the liquid contents thereof; at F and G are shown openings into and from the jacket chamber D for the ingress or egress of the refrigerant or heating medium.

At H an opening is provided through the inner and jacketing walls of the tank for the purpose of inserting a propeller shaft J, to which is affixed on the end inside the tank, a pitched propeller K, and which is suitably joined at the other end to a source of power, such as an electric motor M, by which power it may be caused to be rotated.

The propeller is preferably so positioned with respect to the tank walls, that the lower portion of its periphery, when rotating, approaches the junction of the side walls with the bottom wall and the propeller is inclined with respect to the plane of the side walls, so that when properly placed and rotated so as to thrust liquid across the tank, some of the liquid will pass forwardly from the propeller and strike the bottom wall of the tank being deflected thereby upwardly, the path of such forwardly thrust currents being generally indicated by the arrows 2, 3 and 4, as placed on the drawing of Fig. 1.

The propeller K being placed relatively close to a side wall of the tank will throw liquid peripherally of its blades as indicated by the arrows 5, portions of which liquid striking the side, or bottom walls of the tank, or both, near the junction of the said side and bottom walls will be deflected thereby, the general resultant path of such currents being indicated by the arrows 6 as being generally across the bottom wall of the tank.

The peripherally hurled currents from the propeller, will reinforce the currents 2, 3 and 4 and insure that no sediment or heavy portions of the liquid contained in the tank may settle on the bottom of the tank and in their path.

In a device of this nature, in which a propeller is used there is always the tendency present, of the liquid contents of the tank rotating as a whole about a prolongation of the axis of the propeller; it is an object of this invention to break up this tendency to a considerable degree, by restricting the amount of current which could possibly flow on the under side of this axis and by providing opposing currents such as the peripherally flung currents as deflected by the walls of the tank; and by pointing the propeller downwardly the swirl produced by this rotative tendency is continuously broken up by the baffling and ever changing of the various paths in which the liquid particles travel, so as to effect a thorough intermingling of the different liquid particles to produce what I call efficient agitation.

Having thus described my invention as embodied in a specific structure, I wish it to be understood that the invention is not limited to this structure as illustrated and described, but may be embodied in departures therefrom but still fall within the scope of my invention.

I claim:

1. In a device of the class described, a fluid containing tank having curved side walls and a downwardly dished bottom wall, a propeller shaft and a pitched propeller adapted to be rotated in an inclined plane, said propeller being adapted to be rotated by the said shaft, said propeller being located so near a side wall and the bottom wall that said propeller when rotated in the proper direction will direct a portion of the fluid contents of the tank downwardly across the tank away from the propeller and at the same time hurl other portions substantially radially of the propeller but in a slightly forward direction.

2. In a device of the class described, a fluid containing tank having curved side walls and a downwardly dished bottom wall, a propeller shaft and a pitched propeller adapted to be rotated in an inclined plane, said propeller being adapted to be rotated by the said shaft, said propeller being located so near a side wall and the bottom wall that said propeller when rotated in the proper direction will direct a portion of the fluid contents of the tank downwardly across the tank away from the propeller and at the same time hurl other portions substantially radially of the propeller but in a slightly forward direction, said propeller being so positioned that a projection of its axis of rotation will pass substantially through the vertical axis of the tank.

In witness whereof, I have hereunto signed my name this 25 day of June, 1920.

MAX DONAUER.